United States Patent Office 3,231,393
Patented Jan. 25, 1966

3,231,393
COATING COMPOSITIONS COMPRISING POLYVINYL CHLORIDE COPOLYMER WITH ACRYLIC AND UREA-FORMALDEHYDE RESINS
Denis Joseph Downing, Cary, and Robert James Ludwigsen, Crystal Lake, Ill., assignors to American Can Company, New York, N.Y., a corporation of New Jersey
No Drawing. Filed Jan. 3, 1962, Ser. No. 164,175
10 Claims. (Cl. 99—181)

The present invention relates to a vinyl resin coating composition and in particular to a coating composition having a mixture of vinyl resins as its predominant ingredient in admixture with an acrylic resin and an urea-formaldehyde resin.

The composition of the instant invention has particular utility as a coating directly on a metal surface without an intervening base coat. Such a property makes this coating of special interest as an inside protective lining for sheet metal cans.

A great many cans on the market today, especially cans for the packaging of beer and carbonated beverages, have an interior lining thereon. On the present commercial beer and carbonated beverage cans this interior lining is composed of two coatings, a base coat and a top coat. The top coat in each of these cans is some form of vinyl chloride polymer either by itself or copolymerized with vinyl acetate or vinylidene chloride. It has been found that this vinyl chloride polymer top coating provides the most inert barrier between the metal of the can and the product packed therein, is flexible and tough to enable it to withstand can forming operations, and imparts no off-odor or flavor to the product.

However, such vinyl polymers suffer from two serious defects: (1) they have relatively poor adhesion to bare metal; and (2) when heated in contact with iron, the iron catalyzes heat decomposition or degradation of this resin. To overcome these defects the art has resorted to the use of a base coat between the bare metal and the vinyl top coat. This base coat provides an anchoring film to which the vinyl resin adheres; and covers any exposed iron such as when the base steel is exposed through scratches in a metallic tin covering.

It is therefore an object of the present invention to provide a vinyl resin coating which has good adherence directly to bare metal.

A further object is to provide a vinyl resin coating for metal containing iron which is resistant to heat degradation even when in contact with the iron.

Yet another object is to provide a vinyl resin coating for the direct application to the inside metal surface of a sheet metal can.

Still a further object is to provide a vinyl resin coating for the inside surface of a sheet metal can which needs no base coat between the metal of the can and the coating.

Still another object of the invention is to provide a vinyl resin coating which may be applied over the inside bare metal surface of a sheet metal can, or used as an interior side seam stripe for such a can, or both.

Numerous other objects and advantages of the invention will be apparent as it is better understood from the following description which is of a preferred embodiment thereof.

The above objects are accomplished by formulating a coating composition containing a plurality of different vinyl chloride-vinyl acetate interpolymers, a particular acrylic resin and a urea-formaldehyde resin.

Since, as mentioned previously, it has proven superior to all other resins as the inside coating for sheet metal cans in contact with a beer and carbonated beverage product, the coating of the instant invention predominates in a copolymer of vinyl chloride and vinyl acetate. This copolymer is well known in the art and contains about 87% combined vinyl chloride and 13% combined vinyl acetate. It is best known commercially under the designation Vinylite VYHH resin. For the purpose of the instant invention this resin must be present in the composition in an amount of from 75 to 85%, and preferably about 79%, by weight of the non-volatile ingredients.

The second vinyl resin component of the coating is a copolymer of vinyl chloride and vinyl acetate which has been hydrolyzed to provide the copolymer with from 2 to 20% by weight of combined vinyl alcohol. This vinyl resin is also known in the art and sold commercially under the designation Vinylite VAGH. This vinyl alcohol containing resin must be present in the composition in an amount of from 2 to 12%, and preferably about 9%, by weight of non-volatile ingredients.

The third vinyl resin present in the instant composition is an interpolymer of about 86% vinyl chloride, 13% vinyl acetate and about 1% maleic acid or maleic anhydride, the former being preferred. This vinyl interpolymer is also known in the art and is sold commercially under the designation Vinylite VMCH. It is present in the instant composition in an amount of from 2 to 10%, and preferably about 5%, by weight of non-volatile resinous ingredients. Although it is preferred to incorporate this resin in the formulation, its presence is not essential as with the first and second vinyl resins.

The particular acrylic resin used in the present invention is fully described in U.S. Patents 2,870,116 and 2,955,055. This acrylic resin is the reaction product of a cross-linking agent and an interpolymer of an acrylamide, preferably acrylamide itself, and at least one monomer having a vinylidene group, i.e. $CH_2=C<$. The interpolymerization is carried out in the presence of a suitable peroxide catalyst such as benzoyl peroxide. This interpolymer contains from 5 to 45%, and preferably 8 to 20%, by weight of the acrylamide, the balance being the monomer or monomers containing the vinylidene group. Instead of the preferred acrylamide, metha-acrylamide may be substituted to form the interpolymer.

Preferred as the vinylidene group containing monomer or monomers for interpolymerization with the acrylamide are methyl acrylate, ethyl acrylate, butyl acrylate, styrene, vinyl toluene, acrylic acid and monomethyl styrene. Any one or a mixture of these monomers may be interpolymerized with the acrylamide.

The cross-linking agents for the acrylamide interpolymer found most effective are formaldehyde, N, N'-dimethoxymethyl-N,N'-ethyleneurea and N,N'-bis-methoxymethyluron. It is ordinarily preferred to utilize two equivalents of cross-linking agents for each amide group present in the interpolymer. However, this amount can be raised or lowered if desired. For example, as high as three equivalents of cross-linking agents per amide group or as low as 0.2 equivalent per amide group may be used. This reaction between the interpolymer and cross-linking agent is carried out by heating in the presence of a mild catalyst such as maleic acid or maleic anhydride.

The reaction between the cross-linking agent and the acrylamide interpolymer is not carried out beyond the solvent soluble stage of the reaction product. Since the reaction product must be put into solution with the other non-volatile ingredients of the instant coating composition, such solvent solubility is essential. However, upon further heating, cross-linking continues until a thermoset or near-thermoset product results. The reaction product is present in the coating composition of the instant invention in an amount of from 2 to 6% and preferably about 4% by weight of non-volatile ingredients.

The main film formers responsible for the inert barrier between the metal of the can and the product are primarily the vinyl chloride-vinyl acetate copolymer and secondarily the thermosetting acrylic resin. However, the copolymer has only marginal adhesion to the metal of the can. The acrylic resin, the vinyl chloride-vinyl acetate-maleic acid interpolymer and the hydrolyzed vinyl chloride-vinyl acetate copolymer improve this adhesion somewhat. However, to provide the coating with its superior adhesion to bare metal, from 2 to 8% and preferably about 4% by weight of urea-formaldehyde resin based on total solids is incorporated in the composition. At the time of addition to the composition the urea-formaldehyde resin is in its soluble, fusible B-stage.

While not wishing to be bound by any particular theory, it is believed that the urea-formaldehyde and hydrolyzed vinyl chloride-vinyl acetate copolymer inter-react to provide an adhesion promoting product which provides the excellent adhesion of the coating. Experiments have shown that omitting either the urea-formaldehyde resin or the hydrolyzed vinyl chloride-vinyl acetate copolymer results in very poor adhesion of the coating to the bare metal surface. Additionally, the urea-formaldehyde resin increases the resistance of the vinyl resins to heat degradation.

The liquid or solvent for the resin solids described hereinbefore is a mixture of aromatic hydrocarbon liquids having a distillation range of from 230 to 425° F. and oxygen-containing polar solvents, primarily ketones. Preferred as the hydrocarbon solvents are mixtures of toluene and xylene, alone and with naphthenic hydrocarbons, the latter having a distillation range of from 310 to 365° F. and known commercially as Solvesso 100. The preferred ketones are methyl ethyl ketone, methyl isobutyl ketone and isophorone. Other oxygen-containing polar solvents may be used in conjunction with these ketones, for example, butanol and methyl cellosolve.

The solvent for the resins predominates in the aromatic hydrocarbon which must be present in an amount of between 55 to 80% by weight of volatiles. The ketones are present in an amount of from 10 to 35%; and the other oxygen-containing polar solvents present in an amount of from 5 to 20%. These ratios of aromatic hydrocarbons to polar solvents are necessary to provide the composition as applied to the metal surface with the proper viscosity at the percentage of solids or non-volatiles used. As applied, the composition has a percent solids or non-volatiles of between 10 and 25% and preferably about 15 to 20% by weight. As mentioned previously the composition may be applied to the entire inside surface of a can body; or it may be applied to only the side seam area on the inside of a can body, i.e. as a side seam stripe. For spray application to the whole inside of a can body, the percent solids in the composition are at the higher end of the ranges given and produce a viscosity of about from 35 to 40 seconds Canco Cup at 80° F. For spray side seam striping, the percent solids are at the lower end of the ranges and produce a viscosity of about from 30 to 35 seconds Canco Cup at 80° F.

The following examples are by way of explanation and are not to be considered as limiting the scope of the invention:

*Example 1*

| Ingredient: | Parts by weight |
|---|---|
| Vinyl chloride-vinyl acetate copolymer | 11.5 |
| Hydrolyzed vinyl chloride-vinyl acetate copolymer | 1.36 |
| Vinyl chloride-vinyl acetate-maleic acid interpolymer | .68 |
| Acrylic resin* | .54 |
| Urea-formaldehyde resin | 1.08 |
| Aromatic HC (distillation range 310–365° F.) | 60.40 |
| Isophorone | 12.15 |
| MEK | 0.14 |
| Methyl Cellosolve | 12.15 |

*Prepared in the manner of Example A, U.S. Patent 2,870,116.

This composition has a viscosity of 35 seconds Canco Cup at 80° F. It was sprayed to the bare metal side seam area on the inside of a sheet metal tinplate can body. The side seam had just been soldered and was still hot from this operation. The coated area was further heated to drive off the volatiles and cure the resin solids therein to provide a finished dry side seam stripe of 14 mgs. per 4 square inches of surface coated. This stripe had good adhesion to the bare metal and protected the side seam metal of the resulting can from a product packed therein and the product from off-flavors due to the metal.

*Example 2*

| Ingredient: | Parts by weight |
|---|---|
| Vinyl chloride-vinyl acetate copolymer | 11.5 |
| Hydrolyzed vinyl chloride-vinyl acetate copolymer | 1.36 |
| Vinyl chloride-vinyl acetate-maleic acid interpolymer | .68 |
| Acrylic resin* | .54 |
| Urea-formaldehyde resin | .54 |
| Aromatic hydrocarbon (distillation range 310–365° F.) | 59.90 |
| Xylol | .54 |
| Isohorone | 12.20 |
| Butanol | .44 |
| Methyl cellosolve | 12.30 |

*Prepared in the manner of Example 1, U.S. Patent 2,955,055.

This composition had a viscosity of 35 seconds Canco Cup at 80° F. It was applied to the bare metal side seam in the same manner as Example 1; and produced a solid stripe of about 14 mgs. per 4 square inches of side seam coated. It also had good adhesion to the bare metal and provided good protection to the side seam metal and to a packed product.

*Example 3*

| Ingredient: | Parts by weight |
|---|---|
| Vinyl chloride-vinyl acetate copolymer | 14.59 |
| Hydrolyzed vinyl chloride-vinyl aceate copolymer | 1.71 |
| Vinyl chloride-vinyl acetate-maleic acid interpolymer | 0.85 |
| Acrylic resin* | 0.518 |
| Urea-formaldehyde resin | 0.685 |
| Toluene | 23.86 |
| Xylene | 23.56 |
| MEK | 19.0 |
| MIK | 6.85 |
| Methyl Cellosolve | 7.7 |
| Butanol | 0.66 |
| Acetone | 0.017 |

*Prepared in the manner of Example A, U.S. Patent 2,870,116.

This composition had a viscosity of 36 seconds Canco Cup at 80° F. It was applied by spraying to the bare metal interior surface of a sheet metal tinplate can body and thereafter heated for 6 minutes at 310° F. to drive off the volatiles and cure and solidify the resins. After drying, the interior surface of the can made from this can body had tenaciously adhered thereto a solid coating in an amount of 30 mgs. per 4 square inches of can surface. This coating protected the metal of the can body from corrosion by a product packed in the can and the product from off-flavors due to the metal of the can.

To protect the metal of the can from the can contents and the contents from the can metal, a sufficient thickness or weight of the dry coating must be adhered to the metal surface. For a side seam stripe at least 7 and preferably about 14 mgs. of dry coating per 4 square inches of coated metal must be present; and for a single, over-all inside coating, at least 20 and preferably about 30 mgs. of dry coating per 4 square inches of coated metal must be present. Obviously, the upper limit of coating weight is dictated primarily by economics; i.e. apply no more coating than necessary to provide good protection.

It is thought that the invention and many of its attendant advantages will be understood from the foregoing description and it will be apparent that various changes may be made without departing from the spirit and scope of the invention or sacrificing all of its material advantages.

We claim:

1. A coating composition for bare metal comprising: (1) by weight, 75 to 85% of a vinyl chloride-vinyl acetate copolymer, 2 to 10% of vinyl chloride-vinyl acetate-maleic acid interpolymer, and 2 to 12% of vinyl chloride-vinyl acetate copolymer hydrolyzed to contain 2 to 20% by weight of combined vinyl alcohol; (2) by weight, 2 to 6% of the reaction product of (a) a compound selected from the group consisting of formaldehyde, N,N'-dimethoxymethyl-N,N' ethyleneurea, and N,N'-bis-methoxymethyluron, and (b) an interpolymer of acrylamide and a lower alkyl acrylate; and (3) 2 to 8% by weight of a soluble, fusible, urea-formaldehyde resin.

2. A sheet metal can having the composition of claim 1 applied directly to at least a portion of the inside metal surface thereof.

3. A package comprising a tinplate can containing an aqueous beverage, said can having a longitudinally extending soldered side seam, the bare metal inside surface of said side seam having the cured composition of claim 1 firmly attached thereto.

4. A coating composition for application directly to bare metal comprising, by weight:
(1) from 75 to 85% of a copolymer of vinyl chloride and vinyl acetate;
(2) from 2 to 12% of a hydrolyzed copolymer of vinyl chloride and vinyl acetate containing 2 to 20% of combined vinyl alcohol;
(3) from 2 to 6% of the reaction product of
 (a) a compound selected from the group consisting of formaldehyde, N,N'-dimethoxymethyl-N,N'-ethyleneurea and N,N'-bis-methoxymethyluron, and
 (b) an interpolymer of an acrylamide and at least one monomer selected from the group consisting of methyl acrylate, ethyl acrylate, butyl acrylate, styrene, vinyl toluene, acrylic acid, monomethyl styrene and mixtures thereof; and
(4) from 2 to 8% of an urea-formaldehyde resin.

5. A sheet metal can having the composition of claim 4 applied directly to at least a portion of the interior thereof.

6. The coating composition set forth in claim 4 wherein the acrylamide of (3) is acrylamide.

7. The composition set forth in claim 6 wherein said compound is formaldehyde.

8. The composition set forth in claim 6 wherein said compound is N,N'-dimethoxymethyl-N,N'-ethyleneurea.

9. The composition set forth in claim 6 wherein said compound is N,N'-bis-methoxymethyluron.

10. The composition set forth in claim 4 wherein said monomer is a lower alkyl acrylate.

References Cited by the Examiner

UNITED STATES PATENTS

| | | | |
|---|---|---|---|
| 2,870,116 | 1/1959 | Vogel et al. | 260—853 |
| 2,978,437 | 4/1961 | Christenson | 260—834 |
| 3,050,495 | 8/1962 | Christenson | 260—851 |
| 3,137,666 | 6/1964 | Lox | 260—853 |

SAMUEL H. BLECH, *Primary Examiner.*

LEON J. BERCOVITZ, MURRAY TILLMAN,
*Examiners.*